(12) United States Patent
Yianni et al.

(10) Patent No.: US 8,731,690 B2
(45) Date of Patent: May 20, 2014

(54) LIGHT SYSTEM CONTROLLER AND METHOD FOR CONTROLLING A LIGHTING SCENE

(75) Inventors: George Frederic Yianni, Eindhoven (NL); Mikhail Sorokin, Eindhoven (NL); Gertjan Cornelis Schouten, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 146 days.

(21) Appl. No.: 12/988,012

(22) PCT Filed: Apr. 17, 2009

(86) PCT No.: PCT/IB2009/051598
§ 371 (c)(1),
(2), (4) Date: Oct. 15, 2010

(87) PCT Pub. No.: WO2009/130643
PCT Pub. Date: Oct. 29, 2009

(65) Prior Publication Data
US 2011/0035029 A1 Feb. 10, 2011

(30) Foreign Application Priority Data
Apr. 23, 2008 (EP) .................................. 08103690

(51) Int. Cl.
*G05B 15/00* (2006.01)

(52) U.S. Cl.
USPC .................................. 700/83; 700/17; 700/19

(58) Field of Classification Search
USPC .................................. 700/17, 19, 83, 90, 65
See application file for complete search history.

(56) References Cited

U.S. PATENT DOCUMENTS 5,187,655 A 2/1993 Post et al.
6,574,234 B1 * 6/2003 Myer et al. ................... 370/462

(Continued)

FOREIGN PATENT DOCUMENTS

WO 2007069143 A2 6/2007
WO 2009004531 A1 1/2009
WO 2009004586 A1 1/2009

OTHER PUBLICATIONS

Aner-Wolf, A.: "Determining a Scene's Atmosphere by Film Grammar Rules"; Proceedings of the 2003 International Conference on Multimedia and Expo, vol. 1, 2003, pp. 365-368.

(Continued)

*Primary Examiner* — Mohammad Ali
*Assistant Examiner* — Nathan Laughlin
(74) *Attorney, Agent, or Firm* — Mark L. Beloborodov; John F. Salazar

(57) ABSTRACT

The invention relates to the control, for example the creation or modification of a lighting scene with a lighting system, and the invention particularly relates to a more easily and user oriented controlling of the creation and modification of the lighting scene. An embodiment of the invention provides a light system controller (10) for controlling a lighting scene created with a lighting system (12) comprising an user interface (14) for receiving at least one user defined lighting scene descriptor as an user input (16), processing means (18) being adapted for modifying the properties of the actual lighting scene created with the lighting system in accordance with a received user defined lighting scene descriptor and outputting an appropriate modification output (20), and a lighting system interface (22) being adapted for receiving the modification output from the processing means and for outputting appropriate control signals (24) for light sources (26) of the lighting system for creating a lighting scene in accordance with the input received from the processing means. The light system controller allows a user to easily create and modify lighting scenes, which are created with a complex lighting system.

7 Claims, 3 Drawing Sheets

(56) References Cited

U.S. PATENT DOCUMENTS

| | | | |
|---|---|---|---|
| 7,148,632 B2* | 12/2006 | Berman et al. | 315/189 |
| 7,607,797 B2* | 10/2009 | Walter et al. | 362/231 |
| 2005/0055472 A1* | 3/2005 | Krzyzanowski et al. | 710/5 |
| 2005/0275626 A1 | 12/2005 | Mueller et al. | |
| 2007/0086754 A1 | 4/2007 | Lys et al. | |
| 2007/0233323 A1* | 10/2007 | Wiemeyer et al. | 700/276 |
| 2008/0140231 A1* | 6/2008 | Blackwell et al. | 700/90 |

OTHER PUBLICATIONS

Mols, B.: "For Sale: Mood Tuscany for Your Living Room"; Delft Outlook, 2004, Article on Ambient Control, 6 Page Document.

"Sunlight 2004 Manual"; Trademark of Bruno Nicolaudie, March 2005, Manual on DMX Interface, 77 Page Document.

* cited by examiner

LIGHT SYSTEM CONTROLLER AND METHOD FOR CONTROLLING A LIGHTING SCENE

FIELD OF THE INVENTION

The invention relates to the control, for example the creation or modification of a lighting scene with a lighting system, and the invention particularly relates to a more easily and user oriented controlling of the creation and modification of the lighting scene.

BACKGROUND OF THE INVENTION

Today, there are many types of lighting control solution available. These include simple on/off switches, dimmer switches and more complex systems that store lighting scenes, which can be created by complex lighting systems for creating certain lighting scenes or atmospheres for example in a room. With regard to the control mechanism, the present solutions fall in principle into two categories:

Control solutions which control an individual or group of light sources varying in the same way. For example the on-off switch could toggle the state of a group of three light sources. Such control solutions are characterized by all lights in the group having the same state (on, off, 50% brightness).

Control solutions that set a lighting scene. Here a scene is a stored state of a large collection of light sources that can be recalled at will. Such solutions are characterized by all light sources in the scene having their own preset state for the given scene.

Both categories have their own advantages and disadvantages. The first category can give a very fine control over the state of a light but it quickly becomes impractical to set all light sources as their number increases, for example with complex lighting systems comprising several dozens or even hundreds of independently controllable light units. The second category limits the user to the lighting scenes they have already predefined, and it is time consuming to create new scenes or modify current scenes, as it requires a user to employ method one.

SUMMARY OF THE INVENTION

It is an object of the present invention to provide a novel kind for controlling a lighting scene with a lighting system, which gives a user a new way to easily create and modify a desired lighting scene.

The object is solved by the independent claims. Further embodiments are shown by the dependent claims.

A basic idea of the invention is to allow a user to control a lighting system by means of user defined lighting scene descriptors. A user defined lighting scene descriptor defines a modification of the properties of the actual lighting scene created with a lighting system. The user defined lighting scene descriptor allows a user to quickly and simply create a desired lighting scene and, thus, makes the controlling of a lighting scene easier and more convenient for users.

An embodiment of the invention provides a light system controller for controlling a lighting scene created with a lighting system comprising a user interface for receiving at least one user defined lighting scene descriptor as an user input, processing means being adapted for modifying the properties of the actual lighting scene created with the lighting system in accordance with a received user defined lighting scene descriptor and outputting an appropriate modification output, and a lighting system interface being adapted for receiving the modification output from the processing means and for outputting appropriate control signals for light sources of the lighting system for creating a lighting scene in accordance with the input received from the processing means.

A user defined lighting scene descriptor may be for example a lighting scene descriptor word such as cozy, cheerful, creative, eating etc. Such a descriptor word may be defined by the user and express a user's preferred lighting scene. Technically, the user defined lighting scene descriptor means a kind of abstraction layer for controlling a complex lighting system, which normally requires the adjustment of light source for creating a desired lighting scene. A user defined lighting scene descriptor may represent user trained modifications of a lighting scene in order to create a lighting scene defined by the descriptor.

In a further embodiment of the invention, the user interface may be further adapted for receiving user input for defining a new lighting scene descriptor, and the processing means may be further adapted for setting a new user defined lighting scene descriptor in accordance with the received user input for defining a new lighting scene descriptor.

This enables a user to create new lighting scene descriptors for example be adjusting an actual lighting scene in order to create a desired lighting scene by means of appropriate inputs received by the user interface. For example, a user may adjust the present lighting scene in a room by adjusting parameters via the user interface and store the result as a new user defined lighting scene descriptor.

According to a further embodiment of the invention, the user interface may comprise sliders corresponding to values of user defined lighting scene descriptors allowing a user to define a new lighting scene descriptor. This may assist the user in creating a new lighting scene descriptor, for example by offering sliders for color and brightness of the lighting in certain areas in a room.

A user defined lighting scene descriptor may comprise in an embodiment of the invention a set of modifications of the characteristics of light sources of the lighting system.

According to an embodiment of the invention, the set of modifications of the characteristics of light sources of the lighting system may comprise a color space vector and a brightness vector of a transition from a first state to a second state of a light source of the lighting system, wherein a state of a light source corresponds to a certain point in the color space of the light source and a certain brightness level of the light source. By usage of such vectors, the effect, that any value of a user defined lighting scene descriptor has on a lighting scene, can be extrapolated or interpolated. The magnitude of a transition could be related to how much the value of a lighting scene descriptor is changed.

The processing means may be in an embodiment of the invention further adapted for modifying the properties of the actual lighting scene created with the lighting system in accordance with several received user defined lighting scene descriptors by performing vector additions. This enables a user to easily create new lighting scenes that are a compound of multiple lighting scene descriptors.

In a further embodiment of the invention, the user interface may comprise one or more of the following: an audio unit being adapted for receiving and processing sound as user input; a touch screen; a graphical user interface. An audio unit enables a speech control of lighting scenes. A touch screen has the advantage that it may be programmatically adjusted for example to user habits. A graphical user interface (GUI) may be performed for example by a Personal Computer of a user, thus allowing for example to use existing hardware of a user for implementing at least a part of the inventive light system controller.

The controller may comprise at least one preprogrammed lighting scene descriptor, according to a further embodiment of the invention. A preprogrammed lighting scene descriptor may use the very rough general guidelines available from lighting designers and may offer a user the possibility to quickly create a lighting scene without the need to define or adjust a lighting scene.

Furthermore, in an embodiment of the invention, the controller may be further adapted for allowing the storing of user defined lighting scene descriptors. Thus, a user may instantly recall lighting scenes, which were previously defined by the user, by accessing a memory associated with the controller. The memory may be an external memory or integrated in the controller.

In an embodiment of the invention, the controller may be implemented in the form a remote control unit for the lighting system, wherein the lighting system interface is further adapted to output the appropriate control signals for light sources of the lighting system via a wireless transmission to the lighting system. It may also be possible to implement only parts of the inventive light system controller in the form of the remote control, particularly the user interface, and to implement the other parts such as the processing means and the lighting system interface into a stationary controller module, for example coupled with the lighting system to be controlled. This may make the remote control less costly.

The controller may further comprise in an embodiment of the invention a processor and a program, which configures the processor upon execution of the program to implement the processing means. For example, the controller may be as software implemented in a PDA (Personal Digital Assistant), which usually comprises a powerful processor and a memory for storing programs. Thus, a standard PDA or smart phone of a user may be configured to be used as a light system controller according to the invention. The lighting system interface may be implemented for example by means of a wireless communication interface of the PDA, such as a WLAN (Wireless Local Area Network), Bluetooth®, or infrared interface.

The invention provides in a further embodiment a method for controlling a lighting scene created with a lighting system, wherein the method comprises the steps of receiving at least one user defined lighting scene descriptor as an user input, modifying the properties of the actual lighting scene created with the lighting system in accordance with a received user defined lighting scene descriptor and outputting appropriate control signals for light sources of the lighting system for creating a lighting atmosphere in accordance with the modified properties.

According to a further embodiment of the invention, a computer program may be provided, which is enabled to carry out the above method according to the invention when executed by a computer. Thus, the method according to the invention may be applied for example to existing lighting systems, which may be extended with novel functionality and are adapted to execute computer programs, provided for example over a download connection or via a record carrier.

According to a further embodiment of the invention, a record carrier storing a computer program according to the invention may be provided, for example a CD-ROM, a DVD, a memory card, a diskette, or a similar data carrier suitable to store the computer program for electronic access.

BRIEF DESCRIPTION OF THE DRAWINGS

These and other aspects of the invention will be apparent from and elucidated with reference to the embodiments described hereinafter.

The invention will be described in more detail hereinafter with reference to exemplary embodiments. However, the invention is not limited to these exemplary embodiments.

DETAILED DESCRIPTION OF EMBODIMENTS

The following description of certain exemplary embodiment(s) is merely exemplary in nature and is in no way intended to limit the invention, its application, or uses.

The light system controller according to the invention, described in the following, allows a user to easily create and modify lighting scenes, which are created with a complex lighting system. This is achieved by combining user defined and trained "descriptor words", which are inputted to the light system controller by the user as user defined lighting scene descriptors and processed by the controller to create the desired lighting scene. These "descriptor words" may be trained based on examples given by the user and they can be used to indicate how the color point and brightness of light sources of the lighting system in a scene change. By setting a set of "descriptor words" to a user chosen level new scenes can rapidly be created.

Figure 1:
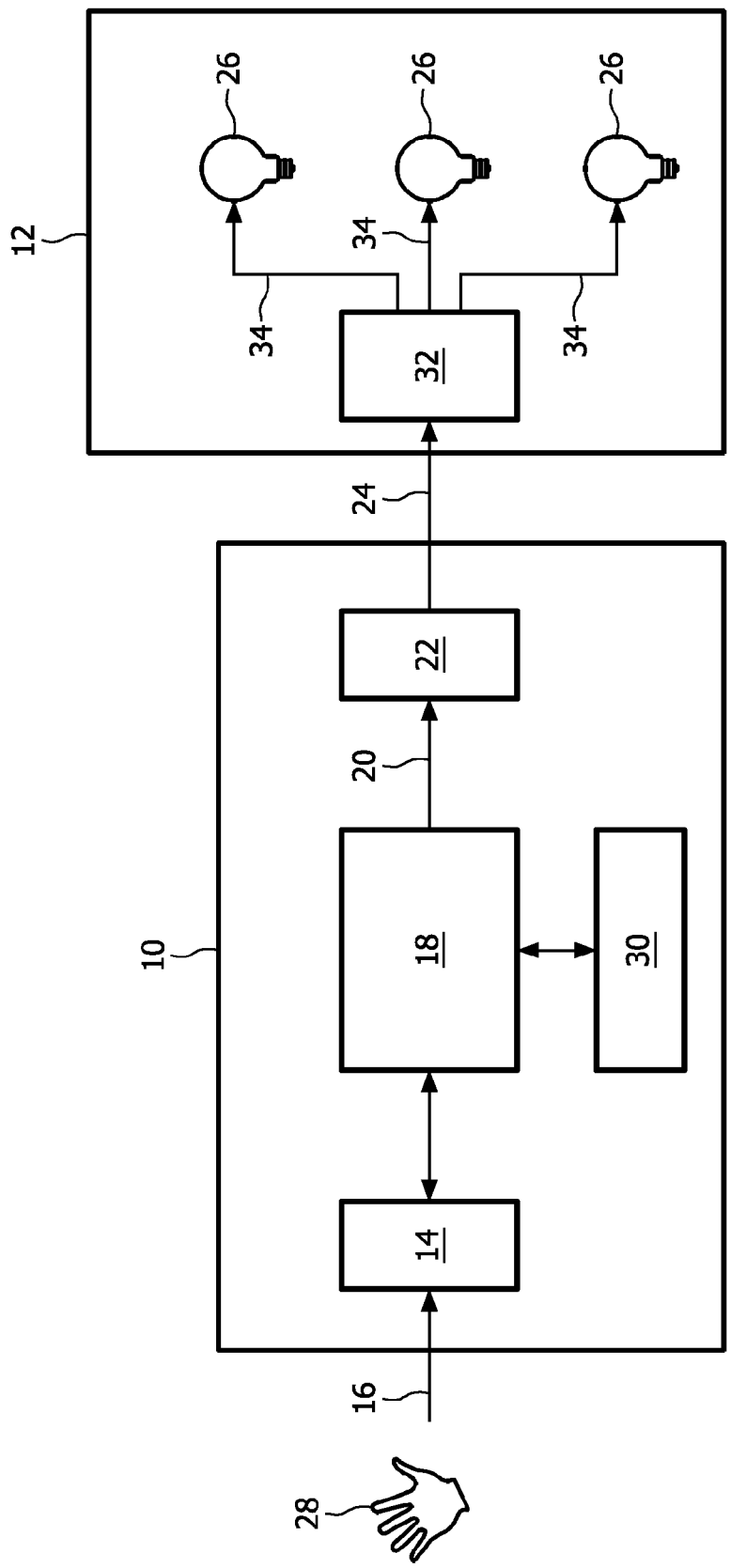
FIG. 1 shows an embodiment of a light system controller according to the invention.

FIG. 1 shows a complex lighting system 12 comprising several independently controlled light sources 26. The light sources 26 may be connected to a control network 34 of the lighting system 12. The lighting system 12 is controlled via control signals 24, which are received from external and control the settings of the light sources 26. The control signals 24 are received via an appropriate interface of the lighting system 12. This interface may be for example part of a central lighting system network control unit 32, which may receive and process the signals in that it controls the light sources 26 addressed by the received control signals in an appropriate way. The control signals typically comprise the setting of the color point in the color space of a light source 26 and the brightness of the light source 26. A light source 26 may not only comprise a single light source, but a group of light sources, which are for example installed in a certain area, for example all light sources installed above a table or behind a TV set in the home of a user.

The control signals 24 are created by a light system controller 10 according to the invention. The controller 10 comprises a user interface 14, a processor 18, a memory 30, and a lighting system interface 22. The main parts of the invention are implemented by software, stored in the memory 30 and executed by the processor 18. The light system controller 10 receives inputs 16 from a user 28. The user interface 14 processes the received input and forwards the processed input to the processor 18 for further processing, namely creating the before mentioned control signals 24 to be outputted via the lighting system interface 22 of the controller such that a lighting scene is created with the lighting system 12 in accordance with the received user's input. Controller-internally, the processor 18 modifies the properties of the actual lighting scene created with the lighting system 12 in accordance with the user's input and outputs an appropriate modification output 20, which is mapped with the lighting system interface 22 to suitable control signals 24 for the light sources 26 of the lighting system 12.

The user input is not related to light source technical details, but is a user defined lighting scene descriptor, for example a "descriptor word" of a user preferred lighting scene such as cozy, cheerful, creative, eating spoken by the user 28 into a microphone or inputted via a touch screen of the user interface 14. The user interface 14 forwards the received user defined lighting scene descriptor to the processor 18, which "transforms" the received input into respective control signals for the light sources 26 of the lighting system 12.

Figure 2A:
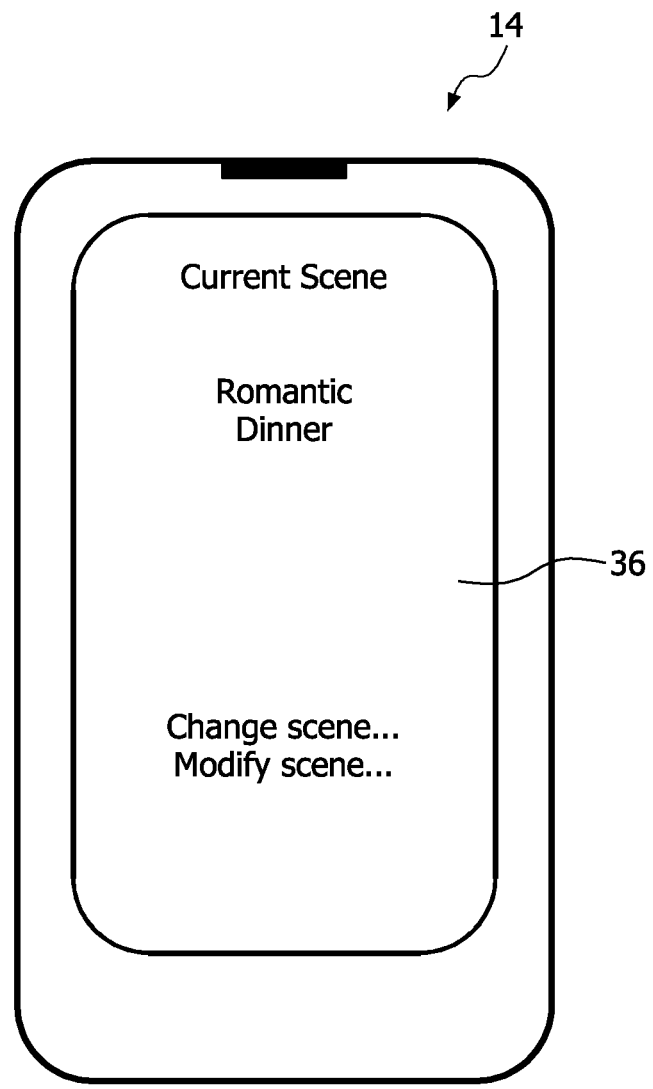
FIG. 2 shows an embodiment of a light system controller in the form of a remote control with two different touch screens.
Figure 2B:
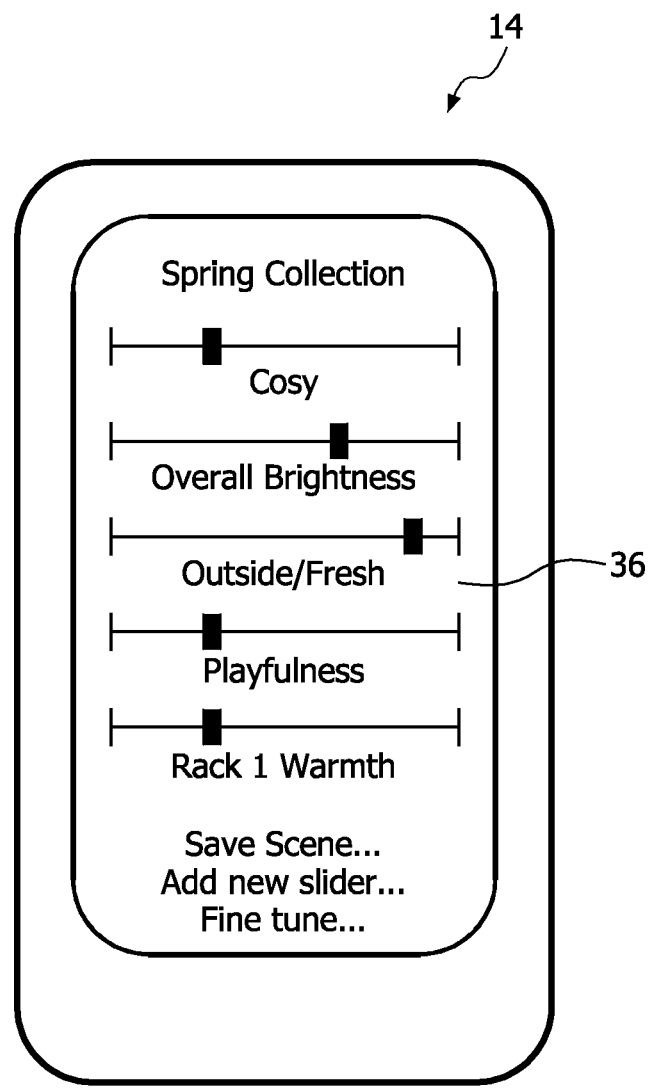

Thus, the main functionality of the light system controller 10 is implemented in terms of a software application that interfaces with the light sources 26 of the lighting system 12 via some connectivity layer (interface 22) and infrastructure. A possible user interface to this software application is shown in FIG. 2 and explained in detail later.

In the following, the functionality of the software application, stored in the memory 30 and executed by the processor 18 to process received user input, is explained in detail.

Within the software application the user can define "descriptor words" as user defined lighting scene descriptor. How these "descriptor words" modify the light is provided by the user in the form of examples. An example would be the characteristic values of all relevant light sources in the scene and would be provided to the software application via the user interface. For example, a user could create a predefined lighting scene and change this lighting scene for her/his preferences, such as dimming the light above a diner table and changing the color of the light illuminating a wall in a room etc. The so adjusted lighting scene can be stored as a user defined lighting scene in the light system controller 10 under a specific name, which may later be used as the user defined lighting scene descriptor to simply recall the preferred lighting scene.

The characteristics of a light source can be expressed in terms of its point in color space and its brightness. The point in color space and brightness of a light source is a state. The change of a state of a light source means a mapping of one state of the light source to another state of the light source. Therefore, if a light source should be switched between two different states (state 1, state 2) there is an action provided in the software application that maps state 1 onto state 2. This action may be defined as the color point and brightness vectors of the transition between different states of a light source and in real terms would represent the direction the light sources takes in color space and how its brightness changes. The magnitude of the transition would be related to how much the value of the "descriptor word" is changed. In this case the descriptor word is accompanied with a value (e.g. "50% cosy"). These vectors define how the color point and brightness of individual lights change as the value of the "descriptor word" is varied. The vectors between two points for each light source are easily obtained by subtraction of their values at these two points. In the case of multiple training points different vectors will be applied different parts of the variation of the "descriptor word". By using these vectors the effect that any value of the "descriptor word" has on the scene can be extrapolated or interpolated. Under this scheme multiple "descriptor words" can be trained by the user. Since the meaning of these "descriptor words" is stored as how they change the light, they can be combined by vector addition to create new scenes that are a compound of multiple "descriptor words". They can also be applied to any existing scheme by vector addition in order to modify it in the desired way. The software application would provide to the connectivity layer how all relevant light sources should change when a "descriptor word" is varied. This connectivity layer would in turn communicate with the light sources and set their characteristic values to the required values.

FIG. 2 a) and b) shows an embodiment of a user interface 14 with a touch screen 36. The shown user interface 14 may be implemented by a remote control for a lighting system, which may also comprise the further functionality and elements of the light system controller 10, shown in FIG. 1. Thus, a compact light system controller 10 for the simple and convenient control of a complex lighting system 10 may be provided. The touch screen 36 shows in FIG. 2 a) the currently created lighting scene, named "Romantic Dinner". Furthermore, it shows two user selectable buttons "Change scene . . . " and "Modify scene . . . ". The button "Change scene . . . " allows the user to switch the light controller 10 into a modus, in which the user can select another lighting scene, wither by inputting a "descriptor word" for the desired lighting scene or by selecting from a list of stored "descriptor words" or another selection method. The button "Modify scene . . . " enables a user to switch the light system controller 10 into a modus, in which the user can change the current lighting scene, for example adapt it to her/his preferences.

FIG. 2 b) shows a touch screen with a user interface comprising sliders on the touch screen 36. These sliders would correspond to values of the "descriptor words". The values may range from 0 to 1 or 0% to 100%. The range of one or more sliders may be limited in order to limit possible changes for the user by the light designer. By combining several of these trained sliders at different levels new scenes could easily be created. Similarly by modifying the sliders of an existing scene it could be tweaked to the current requirements. The shown touch screen also comprises buttons "Save Scene . . . ", "Add new slider . . . " and "Fine tune . . . " which may offer the user further possibilities to manage her/his user defined lighting scene descriptors or "descriptor words". At the top of the touch screen, it is shown that the shown sliders belong to the "Spring Collection", which may define a group of lighting scenes, which may create spring-like lighting atmospheres in a room. The button "Save Scene . . . " allows users to store scenes that have been created for instant recall. In a further possible refinement of the user interface 14, the creator of a scene could limit the number of sliders that are available for tweaking a scene. This would restrict the user of a scene to only modify it in ways desired by the scene designer. Furthermore, in a possible refinement of the user interface 14, the ability to delete and retrain "descriptor words" could be available. A further refinement of the user interface 14 may provide that certain "descriptor words" could come preprogrammed into the light system controller 10 which use the very rough general guidelines available from lighting designers. The resulting "descriptor words" would have to be refined by the end user as they wouldn't account for their personal tastes or lighting arrangement.

Finally, typical applications of the invention in Homes and Retail are described.

Homes

The invention would give users at home a way of easily creating and modifying lighting scenes. At present when a user creates a new scene she/he must do so by individually setting then brightness and color point of every light source. This becomes increasingly time consuming and tedious as the number of light sources increases.

It is not natural for the user to change or create a scene in terms of changes to multiple individual lights. It is more natural to think in terms of the overall feel of the room, for example the users want the room to feel more cozy rather than the users want light 5 through 9 to have reduced brightness and have their color point shifted to red.

This invention would allow the user to control these global qualities of the light in the room by employing training the system in how to manipulate the light sources in response to varying levels of "descriptor words". These "descriptor words" would be created, named and trained by the user and as such would learn how to manipulate the light in exactly the way intended by the user. It may be assumed that the most useful "descriptor words" would be related to modifying atmosphere describers (e.g. cozy, cheerful, exciting) or function describers (e.g. table, TV, reading).

For illustration, considering a room with multiple light sources, the room initially is in its plain state with all light source at half brightness and having a neutral color point. A "cozy" descriptor word is created—the current light level is taken as 0% "cozy". The user now sets the lights how she/he thinks they should be for 50% "cozy". The appropriate slider of the user interface is now trained; it knows how all the light sources need to be modified when the "cozy" descriptor word is increased or decreased. In other words it has learnt all the color point and brightness vectors in the "cozy" direction. For this example, the "cozy" vectors could correspond to certain light sources illuminating the walls decreasing in brightness and moving to a warmer color point more strongly, while other light sources illuminating the center of the room decrease less.

The system would not need to place a limit on what could be trained, for example a table descriptor word could be created which is trained to increase the brightness over the dining table and dim the rest of the light sources. If the user wanted to create a new scene, the user could increase or decrease any combination of descriptor words (e.g. 50% "cozy", 50% table could be a romantic dining scene). Alternatively, if the user would be in the TV watching scene and the user receives some company she/he could tweak the scene by increasing the "cosy" descriptor instantly modifying the atmosphere of the scene.

Retail

Here, there are usually two users of the system to be considered, the lighting designer and the shop worker. The management are unlikely to allow the shop worker full control over the lighting as they are not an expert in this. However, this system allows the light designer to provide the scene aimed at, for example, different ages, hence providing the training for an age "descriptor word". The shop worker would then still be able to modify the lighting scene to apply to the current clientele but only within the confines of the designer's vision.

As described above, the invention may give a user a new way to easily control the lighting atmosphere in a room. It particularly allows the user to adjust and combine certain parameters that have been trained, e.g. cozy, cheerful, creative, eating etc. Each of the trained parameters may have a direct correspondence to the way the lighting changes. Thus, the invention behaves like a kind of learning system that may be trained based on examples given by the user and so can work for any light arrangement and is compatible with any user's tastes.

Users can describe the collective atmosphere they want, all their light sources to provide, in terms of the above mentioned "descriptor words" which can be trained to change the scene in exactly the way the user desires. Training will be by example and hence simple and transparent. Having a set of these defined makes it very easy to tweak existing lighting scenes or combine these "descriptor words" in different ways to make new scenes. All this gives the user an unprecedented ease of control over the light-provided atmosphere of a lighting scene as they are now modifying natural parameters.

The invention allows the user to modify the properties of the whole scene in terms of "descriptor words" which mean something specific to the user. Further, the invention may learn exactly what the user means by these "descriptor words" so the scenes behavior in response to these may be tailored exactly to the users tastes and lighting set up. This would not be possible with a stored knowledge of what certain atmosphere words mean as everyone's tastes and lighting arrangement is different.

The problem with most existing lighting control solutions, which store preset scenes, is not only the difficulty in creating the scenes but also in their rigidity. It is not easy to tweak a scene to the specific requirements because it must be done with control of the individual light sources. In contrast to this, the invention allows easy tweaking of scenes as any whole scene "descriptor word" could be changed.

In some applications it is required that the user has limited control over the scene. Offering flexibility whilst ensuring that user maintains the desired effect is not possible. The invention allows "descriptor words" to be trained which allow a scene to be varied in exactly the way the designer envisages. This could allow the end user flexibility in the lighting design but only in the way desired by the lighting designer.

At least some of the functionality of the invention may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:

1. A light system controller for controlling a lighting scene created with a lighting system comprising:
    a user interface for receiving at least one user input associated with a user-defined new lighting scene descriptor related to a descriptor word;
    processing means for setting the new user-defined lighting scene descriptor by modifying properties of an actual lighting scene created with the lighting system in accordance with the received user input and outputting an appropriate modification output; and
    a lighting system interface for receiving the modification output from the processing means and for outputting appropriate control signals for light sources of the lighting system for creating a new lighting scene in accordance with the user input;
    wherein a user-defined lighting scene descriptor includes a set of modifications of the characteristics of the light sources of the lighting system expressed as color space and brightness vectors, wherein the color space vector indicates an adjustment to be made to a color of light emitted by the light sources relative to a current color emitted by the light sources and the brightness vector indicates an adjustment to be made to a brightness of light emitted by the light sources relative to a current brightness of light emitted by the light sources;
    wherein the processing means are further adapted for modifying the properties of the actual lighting scene created with the lighting system in accordance with a cumulative color space vector and a cumulative brightness vector calculated based on vector addition of multiple color space and brightness vectors.

2. The controller of claim 1, wherein
the user interface comprises sliders corresponding to values of user-defined lighting scene descriptors allowing a user to define a new lighting scene descriptor.

3. The controller of claim 1, wherein the user interface comprises one or more of the following: an audio unit being adapted for receiving and processing sound as user input; a touch screen; a graphical user interface.

4. The controller of claim 1, comprising at least one preprogrammed lighting scene descriptor.

5. The controller of claim 1, being further adapted for allowing the storing of user defined lighting scene descriptors.

6. A method for controlling a lighting scene created with a lighting system comprising the steps of:
defining at least one lighting scene descriptor word which are used to indicate how the color point and brightness of a light source of the lighting system on the scene change;
receiving the at least one user defined lighting scene descriptor word as a user input,
modifying properties of an actual lighting scene created with the lighting system in accordance with the at least one received user defined lighting scene descriptor word and outputting appropriate control signals for light sources of the lighting system for creating a lighting atmosphere in accordance with the modified properties;
receiving user input for defining a new lighting scene descriptor word,
setting a new user defined lighting scene descriptor word in accordance with the received user input for defining a new lighting scene descriptor word; and
modifying the properties of the actual lighting scene created with the lighting system in accordance with a cumulative color space vector and a cumulative brightness vector calculated based on vector addition of color space and brightness vectors of transition associated with multiple received user-defined lighting scene descriptor words, said vectors of transition including a magnitude related to the user defined lighting scene descriptor word mapped to a value and used to calculate said vectors of transition.

7. A remote control unit for a lighting system, the remote control unit comprising the controller of claim 1, wherein the lighting system interface is further configured to output the control signals for light sources of the lighting system via a wireless transmission.

* * * * *